United States Patent
Faith et al.

(10) Patent No.: US 8,856,043 B2
(45) Date of Patent: Oct. 7, 2014

(54) METHOD AND SYSTEM FOR MANAGING DATA AND ENABLING PAYMENT TRANSACTIONS BETWEEN MULTIPLE ENTITIES

(75) Inventors: Patrick Faith, Pleasanton, CA (US); Mark Carlson, Half Moon Bay, CA (US); Theodore D. Harris, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 28 days.

(21) Appl. No.: 13/400,000

(22) Filed: Feb. 17, 2012

(65) Prior Publication Data

US 2012/0215693 A1    Aug. 23, 2012

Related U.S. Application Data

(60) Provisional application No. 61/444,276, filed on Feb. 18, 2011.

(51) Int. Cl.
| | |
|---|---|
| *G06Q 40/00* | (2012.01) |
| *H04M 15/00* | (2006.01) |
| *G06Q 20/12* | (2012.01) |
| *G06Q 20/02* | (2012.01) |

(52) U.S. Cl.
CPC .............. *G06Q 20/027* (2013.01); *G06Q 20/12* (2013.01); *G06Q 20/02* (2013.01)
USPC .............................................. 705/44; 705/39

(58) Field of Classification Search
USPC ........................................... 709/214; 463/16
See application file for complete search history.

(56) References Cited

U.S. PATENT DOCUMENTS

| | | | | |
|---|---|---|---|---|
| 4,658,093 A | * | 4/1987 | Hellman | 705/52 |
| 5,181,107 A | * | 1/1993 | Rhoades | 725/105 |
| 5,613,012 A | | 3/1997 | Hoffman et al. | |
| 5,615,277 A | | 3/1997 | Hoffman | |
| 5,630,204 A | * | 5/1997 | Hylton et al. | 725/116 |
| 5,654,746 A | * | 8/1997 | McMullan et al. | 725/29 |
| 5,677,905 A | * | 10/1997 | Bigham et al. | 370/395.21 |
| 5,734,589 A | * | 3/1998 | Kostreski et al. | 715/716 |
| 5,737,439 A | | 4/1998 | Lapsley et al. | |

(Continued)

FOREIGN PATENT DOCUMENTS

| | | |
|---|---|---|
| AU | 750154 B2 | 11/2002 |
| WO | WO 96/36934 A1 | 11/1996 |

(Continued)

OTHER PUBLICATIONS

International Search Report and Written Opinion of PCT Application No. PCT/US2012/025721, mailed on Dec. 28, 2012, 10 pages.

(Continued)

*Primary Examiner* — Evens J Augustin

(57) ABSTRACT

A system for conducting payment transaction includes a network-enabled server that communicates with one or more user devices, other network-enabled server computers, and a payment processing network server computer. The network-enabled server facilitates transactions between one or more merchants and users by a managing data flow and interactions between the merchants and the users, providing storage area for storing of all transaction related documents, and providing seamless integration with a payment processing network for payment processing.

20 Claims, 7 Drawing Sheets

(56) References Cited

U.S. PATENT DOCUMENTS

| | | |
|---|---|---|
| 5,764,789 A | 6/1998 | Pare et al. |
| 5,802,199 A | 9/1998 | Pare et al. |
| 5,805,719 A | 9/1998 | Pare et al. |
| 5,838,812 A | 11/1998 | Pare et al. |
| 5,870,723 A | 2/1999 | Pare et al. |
| 5,982,914 A | 11/1999 | Lee et al. |
| 6,012,039 A | 1/2000 | Hoffman et al. |
| D425,873 S | 5/2000 | Anderson et al. |
| 6,131,464 A | 10/2000 | Pare et al. |
| 6,154,879 A | 11/2000 | Pare et al. |
| 6,192,142 B1 | 2/2001 | Pare et al. |
| 6,209,104 B1 | 3/2001 | Jalili |
| 6,226,624 B1 * | 5/2001 | Watson et al. .................. 705/44 |
| 6,230,148 B1 | 5/2001 | Pare et al. |
| 6,253,193 B1 * | 6/2001 | Ginter et al. .................... 705/57 |
| 6,263,313 B1 * | 7/2001 | Milsted et al. .................. 705/50 |
| 6,269,348 B1 | 7/2001 | Pare et al. |
| 6,327,652 B1 * | 12/2001 | England et al. .................... 713/2 |
| 6,363,149 B1 * | 3/2002 | Candelore ........................ 380/45 |
| 6,363,357 B1 * | 3/2002 | Rosenberg et al. ............. 705/51 |
| 6,366,682 B1 | 4/2002 | Hoffman et al. |
| 6,397,198 B1 | 5/2002 | Hoffman et al. |
| 6,411,728 B1 | 6/2002 | Lee et al. |
| 6,418,421 B1 * | 7/2002 | Hurtado et al. ................. 705/54 |
| 6,574,609 B1 * | 6/2003 | Downs et al. ................... 705/50 |
| 6,581,042 B2 | 6/2003 | Pare et al. |
| 6,591,002 B2 | 7/2003 | Lee et al. |
| 6,594,376 B2 | 7/2003 | Hoffman et al. |
| 6,599,194 B1 * | 7/2003 | Smith et al. ...................... 463/30 |
| 6,662,166 B2 | 12/2003 | Pare et al. |
| 6,675,153 B1 | 1/2004 | Cook et al. |
| 6,697,489 B1 * | 2/2004 | Candelore ...................... 380/200 |
| 6,728,397 B2 | 4/2004 | McNeal |
| 6,769,989 B2 * | 8/2004 | Smith et al. ...................... 463/41 |
| 6,820,063 B1 * | 11/2004 | England et al. ................. 705/54 |
| 6,834,110 B1 * | 12/2004 | Pacifici et al. ................. 380/239 |
| 6,871,188 B2 * | 3/2005 | De Souza ..................... 705/26.8 |
| 6,879,966 B1 | 4/2005 | Lapsley et al. |
| 6,920,435 B2 | 7/2005 | Hoffman et al. |
| 6,950,810 B2 | 9/2005 | Lapsley et al. |
| 6,957,770 B1 | 10/2005 | Robinson |
| 6,978,022 B2 * | 12/2005 | Okimoto et al. .............. 380/211 |
| 6,980,670 B1 | 12/2005 | Hoffman et al. |
| 6,985,608 B2 | 1/2006 | Hoffman et al. |
| 7,004,389 B1 | 2/2006 | Robinson et al. |
| 7,080,397 B2 * | 7/2006 | Cochran et al. ................. 725/87 |
| 7,082,415 B1 | 7/2006 | Robinson et al. |
| 7,152,045 B2 | 12/2006 | Hoffman |
| 7,185,807 B1 | 3/2007 | Robinson et al. |
| 7,233,948 B1 * | 6/2007 | Shamoon et al. ..................... 1/1 |
| 7,248,719 B2 | 7/2007 | Hoffman et al. |
| 7,269,737 B2 | 9/2007 | Robinson |
| 7,319,987 B1 | 1/2008 | Hoffman et al. |
| 7,367,049 B1 | 4/2008 | Robinson et al. |
| 7,387,240 B2 | 6/2008 | Ziegler |
| 7,389,269 B1 | 6/2008 | Robinson et al. |
| 7,437,330 B1 | 10/2008 | Robinson et al. |
| 7,464,059 B1 | 12/2008 | Robinson et al. |
| 7,483,862 B1 | 1/2009 | Robinson et al. |
| 7,497,372 B1 | 3/2009 | Robinson et al. |
| 7,502,761 B2 | 3/2009 | Siegal et al. |
| 7,512,567 B2 | 3/2009 | Bemmel et al. |
| 7,526,652 B2 | 4/2009 | Ziegler |
| 7,533,066 B1 | 5/2009 | Robinson et al. |
| 7,533,809 B1 | 5/2009 | Robinson et al. |
| 7,536,352 B2 | 5/2009 | Lapsley et al. |
| 7,542,590 B1 | 6/2009 | Robinson et al. |
| 7,545,621 B2 | 6/2009 | Haddad |
| 7,558,406 B1 | 7/2009 | Robinson et al. |
| 7,558,407 B2 | 7/2009 | Hoffman et al. |
| 7,565,329 B2 | 7/2009 | Lapsley et al. |
| 7,606,401 B2 | 10/2009 | Hoffman et al. |
| 7,613,659 B1 | 11/2009 | Hoffman et al. |
| 7,620,605 B2 | 11/2009 | Hoffman et al. |
| 7,624,073 B1 | 11/2009 | Robinson et al. |
| 7,631,193 B1 | 12/2009 | Hoffman |
| 7,698,567 B2 | 4/2010 | Hoffman |
| 7,747,528 B1 | 6/2010 | Robinson et al. |
| 7,765,164 B1 | 7/2010 | Robinson et al. |
| 7,769,695 B2 | 8/2010 | Robinson et al. |
| 7,778,933 B2 | 8/2010 | Robinson et al. |
| 7,831,468 B1 | 11/2010 | Conte et al. |
| 7,836,485 B2 | 11/2010 | Robinson et al. |
| 7,865,567 B1 * | 1/2011 | Hendricks et al. ............. 709/214 |
| 7,882,032 B1 | 2/2011 | Hoffman |
| 7,970,678 B2 | 6/2011 | Lapsley |
| 8,015,118 B1 | 9/2011 | Robinson et al. |
| 8,167,200 B2 * | 5/2012 | Uchikura ....................... 235/380 |
| 2001/0046299 A1 * | 11/2001 | Wasilewski et al. .......... 380/282 |
| 2002/0044658 A1 * | 4/2002 | Wasilewski et al. .......... 380/239 |
| 2004/0073510 A1 | 4/2004 | Logal et al. |
| 2004/0152504 A1 * | 8/2004 | Herrmann et al. ............... 463/16 |
| 2006/0106734 A1 | 5/2006 | Hoffman et al. |
| 2006/0265602 A1 | 11/2006 | Robinson |
| 2007/0162337 A1 | 7/2007 | Hawkins |
| 2007/0282677 A1 | 12/2007 | Carpenter |
| 2007/0288319 A1 | 12/2007 | Robinson |
| 2007/0288320 A1 | 12/2007 | Cooper |
| 2008/0097851 A1 | 4/2008 | Bemmel |
| 2008/0147481 A1 | 6/2008 | Robinson |
| 2008/0154772 A1 | 6/2008 | Carlson |
| 2008/0162365 A1 * | 7/2008 | Lakkapragada et al. ......... 705/75 |
| 2008/0271116 A1 | 10/2008 | Robinson et al. |
| 2009/0037982 A1 | 2/2009 | Wentker et al. |
| 2009/0070270 A1 | 3/2009 | Robinson et al. |
| 2009/0074256 A1 | 3/2009 | Haddad |
| 2009/0099944 A1 | 4/2009 | Robinson |
| 2009/0138366 A1 | 5/2009 | Bemmel |
| 2009/0177587 A1 | 7/2009 | Siegal |
| 2009/0228362 A1 | 9/2009 | Lapsley |
| 2009/0281948 A1 | 11/2009 | Carlson |
| 2010/0125737 A1 * | 5/2010 | Kang ............................ 713/176 |
| 2010/0198728 A1 * | 8/2010 | Aabye et al. .................... 705/44 |
| 2011/0016043 A1 * | 1/2011 | Dornseif ......................... 705/39 |
| 2011/0035319 A1 * | 2/2011 | Brand et al. .................... 705/44 |
| 2011/0046969 A1 | 2/2011 | Carlson |

FOREIGN PATENT DOCUMENTS

| | | |
|---|---|---|
| WO | WO 98/09227 A1 | 3/1998 |
| WO | WO 98/15924 A1 | 4/1998 |
| WO | WO 98/41947 A1 | 9/1998 |
| WO | WO 99/31621 A1 | 6/1999 |
| WO | WO 00/26849 A1 | 5/2000 |
| WO | WO 00/45247 A1 | 8/2000 |
| WO | WO 00/45320 A1 | 8/2000 |
| WO | WO 00/46710 A1 | 8/2000 |
| WO | WO 00/46737 A1 | 8/2000 |
| WO | WO 00/67187 A1 | 11/2000 |
| WO | WO 01/06440 A1 | 1/2001 |
| WO | WO 01/20531 A1 | 3/2001 |
| WO | WO 02/14984 A2 | 2/2002 |
| WO | WO 2007/092715 A2 | 8/2007 |
| WO | WO 2008/002979 A2 | 1/2008 |
| WO | 2012/112941 A2 | 8/2012 |

OTHER PUBLICATIONS

U.S. Appl. No. 10/678,646, filed Oct. 6, 2003; Robinson et al. (31 pages).

\* cited by examiner

METHOD AND SYSTEM FOR MANAGING DATA AND ENABLING PAYMENT TRANSACTIONS BETWEEN MULTIPLE ENTITIES

CROSS REFERENCES TO RELATED APPLICATIONS

This application claims priority under 35 USC §119(e) to U.S. Provisional Patent Application No. 61/444,276, filed on Feb. 18, 2011, the disclosure of which is incorporated by reference herein in its entirety for all purposes.

BACKGROUND

In a traditional payment transaction scenario, a user uses a payment device at an access device to pay for a product or service. The payment device information is sent to a payment processing network, which communicates with an issuer of the payment device to authorize the transaction. The issuer merely checks if the user has enough balance/credit left in the account to cover the amount of transaction.

Thus, in the conventional method there is no validation of the transaction itself. For example, the issuer cannot request additional documentation from either the merchant or the user to verify whether the service/product that is subject of the transaction is actually required and/or provided to the user. In other words, nothing is done to check whether the transaction is genuine, proper, or actually initiated by the payment device holder. In the conventional system, if the user has enough balance/credit in his account and the required transaction details are provided by the merchant, the transaction is processed without additional verification. The problem is especially acute when there are more than two entities involved in a transaction where the entity paying for the product/service is not the entity that actually receives the product/service.

Currently, the existing payment processing systems are not equipped to handle the extra traffic that may be generated by the information/documentation related to each payment transaction that involves multiple entities. Thus, there is a need for a new infrastructure that can handle the increased traffic generated because of the extra validation processes and thereafter process payment once the transaction is validated.

SUMMARY

Embodiments of the present invention are generally related to processing payment transactions. In particular, certain embodiments of the present invention provide a system that enables end-user devices to interact directly with payment processing systems without having to go through another entity. Other embodiments of the present invention provide a method for performing payment transactions with added security and validation. The system provides a mechanism for managing all transactions associated with getting paid for performing a service or getting paid for selling a product. The system and method disclosed herein minimize the delay between performance of a service and getting paid for the performed service and/or selling a product and getting paid for selling a product.

Some embodiments of the present invention provide a system for processing transactions. The system comprises a payment processing network server computer configured to communicate with an issuer to process payment requests and a network-enabled server computer configured to communicate with one or more external systems. The network-enabled server computer is further configured to receive a payment request from a merchant computer for authorizing payment for a transaction, request additional information associated with the transaction from the merchant computer and send a validation request to a user device to validate the payment request. The network-enabled server computer further receives a response to the validation request and alias information about the user. Network-enabled server computer then determines payment account information based on the alias. The network-enabled server computer communicates the payment account information to the payment processing network server computer.

In some embodiments, the network-enabled server computer may also receive information from the payment processing network server computer indicating successful processing of the payment transaction and communicate the information to the merchant computer and/or the user device. In some embodiments, the network-enabled server computer communicates with the user device and the merchant computer using WSDL messaging techniques, RESTful computing techniques, and/or JSON.

Some embodiments of the present invention provide a network-enabled server computer. The network-enabled server computer includes an alias database comprising information about one or more aliases, an alias hierarchy database comprising association information between an alias and one or more objects associated with the alias, an application interface configured to communicate with one or more external devices, and a data storage configured to store data. In some embodiments, the one or more aliases comprise identifiers associated with a plurality of entities, wherein an entity includes an individual or a company. In some embodiments, the alias database includes payment account information associated with an alias. In some embodiments, the one or more objects include mobile communication devices, televisions, and gaming consoles. The application interface may be configured to communicate with the one or more external devices using WSDL and/or JSON messaging techniques.

Some embodiments of the present inventions provide a method for processing a payment transaction. The method includes receiving a first message from a merchant server computer requesting authorization for a transaction, sending a second message to the merchant server computer requesting additional information related to the transaction, and receiving a third message from the merchant server computer including the requested information. The method further includes sending a fourth message to a user device requesting a user to validate the transaction, receiving a fifth message from the user device including validation information, and receiving a sixth message from the user device including payment account information. Thereafter, the method further includes sending a seventh message to a payment processing network server computer including the payment account information and transaction information, receiving an eight message from the payment processing network server computer including results of the payment transaction processing, and sending a ninth message to the merchant server computer including the results of the payment transaction processing.

In some embodiments, the additional information related to the transaction may include documents, images, audio, video, or graphics. In some embodiments, one or more of the first message, the second message, the third message, the fourth message, the fifth message, the sixth message, and the ninth message are sent using WSDL techniques. In some embodiments, one or more of the first message, the second message, the third message, the fourth message, the fifth message, the sixth message, and the ninth message are sent using RESTful computing techniques. In other embodiments, one or more of the first message, the second message, the third message, the fourth message, the fifth message, the sixth message, and the ninth message are created using JSON. In some embodiments, the first message includes alias information of the user. In an embodiment, prior to sending the fourth message, the server computer may consult an alias database to determine the user device associated with the alias. In some embodiments, the payment account information is stored in the server computer.

DETAILED DESCRIPTION

Embodiments of the present invention provide a system for validating and processing payment transactions between multiple parties. The system includes a payment processing network sever computer, data management server computer, a user and one or more merchants.

Figure 1:
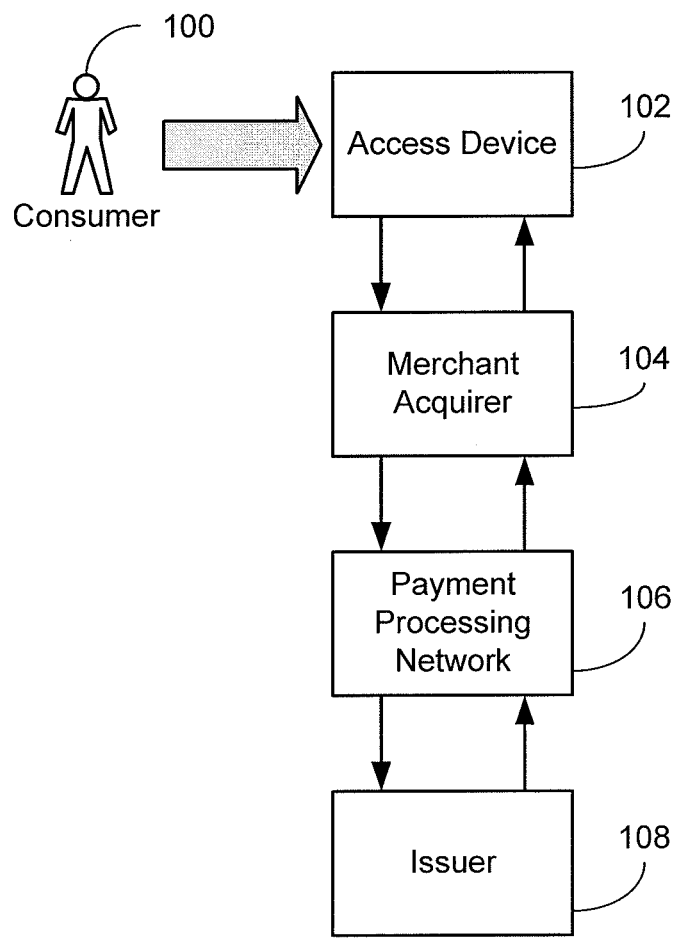
FIG. 1 is a flow diagram of a traditional payment processing process.

In order to provide a better understanding of the present disclosure, a brief review of transaction processing as it exists today is provided with reference to FIG. 1. For ease of discussion, a transaction conducted in a physical store is described, however it should be understood that similar steps occur in any type of transaction, including online transactions. In a typical transaction, a user 100 may select goods or services to purchase at a merchant. The user may then pay for the goods or services by presenting a transaction card, such as a debit or credit card, to the merchant. The merchant may then swipe the transaction card through an access device 102, e.g., a Point of Sale ("POS") terminal, to read the account number from the transaction card.

Access device 102 may then send the account number to a merchant system, where other information related to the transaction, such as purchase amount, may be added. It should be noted that in some cases, the access device and the merchant system are a single device, in which the account number is read, and the purchase amount is keyed in by the merchant. The transaction details, such as the account number and purchase amount are then sent from the merchant system to an acquirer system 104 to request transaction authorization. An acquirer is generally a bank that holds an account for the merchant in which funds resulting from the transaction may eventually be deposited.

The acquirer system 104 then receives the transaction details, and determines a payment processing network 106 that may process the transaction. The acquirer 104 routes the transaction to the appropriate payment processing network 106, which in turns determines the issuer 108 of the transaction card. As mentioned above, an issuer 108 may provide the user with an account that holds cash or a line of credit. The payment processing network 106 then routes the transaction to the correct issuer 108 for a transaction authorization decision. If the user has sufficient funds in the account or sufficient available credit, the issuer 108 may authorize the transaction. The authorization response is transmitted back to the merchant, through the payment processing network 106, the acquirer 104, and the access device 102. The user has then completed the purchase of the goods or services. At a later point in time, a settling and clearing process may occur, in which the funds are actually transferred from the user's account (or drawn on the line of credit) to the merchant's account at the acquirer. The settlement and clearing process occurs using the account number, wherein a request for funds may be compared to a previous authorization, and if an authorization exists, the funds are transferred.

Transactions may become even more complicated when a Personal Identification Number ("PIN") is required. For example, in the case of some debit card transactions, a PIN must be entered by the user. The PIN is typically entered into the access device in clear form by the user. The PIN is then encrypted using a Pin Encryption Key (PEK) in the access device and is sent to a merchant system, which also knows the PEK. The merchant system, then decrypts the PIN using the PEK, and encrypts it again using an acquirer working key (AWK), which is a key known by the merchant and the acquirer. The acquirer then decrypts the PIN using the AWK and encrypts again using a payment processor key. The payment processor in turn decrypts the PIN and encrypts using an issuer working key. The issuer then decrypts the PIN and determines if the PIN is correct.

In the traditional payment processing process described above, the transaction is usually between a single entity that is purchasing a product or a service and a single entity that is providing the product or a service. There is no mechanism to validate or request more information about a transaction, as part of payment processing process, before approving that transaction. For example, if a user is requesting a service from a first merchant which may be paid for by a second merchant contracted by the user, currently there is no mechanism by which the second merchant can ensure, as part of the payment processing operation, that (a) the service is actually needed and (b) proper documentation is available in order to authorize that service. In most of these situation, the first merchant, the second merchant, and the user end up exchanging information among themselves either prior to performance of the service or after the service is rendered in order to authorize payment for the service.

The traditional process is very cumbersome and slow. In many cases, it often takes weeks or months before the first merchant gets paid for the service he has provided. Also, since most of the processing for payment authorization involves printed paperwork and communication via regular mail, instances of lost documentation a plentiful, which further delays the performance of a service and/or payment for a service already performed. In addition, the traditional process is labor intensive and is costly for the merchants who generally recover part of the costs from the users. Embodiments of the present invention serve to alleviate these and many other issues with the current mechanism.

Embodiments of the current invention provide a mechanism for integrating the payment processing infrastructure with a new infrastructure for handling the supporting documentation and information needed to effect the payment processing. Many advantages can be realized with the system and methods described below. First, by automating most of the traditional mechanisms for service and payment authorization, the proposed system can greatly enhance the speed and efficiency of execution. Second, the system leverages use of billions of network connected servers and user devices such as cell phones, mobile computing devices, TVs', etc. to enable a user and a merchant to interact quickly and efficiently without having to resort to traditional methods like mailing of documents. This may greatly enhance the speed of processing both the transaction authorization and payment processing aspects of a transaction. Third, since the system uses a web-based cloud server configuration to store data, the data is available for access virtually anywhere in the world at anytime further reducing the delay in the entire process. Fourth, the system uses WSDL, JSON, and/or RESTful messaging, which are universally supported by virtually all the current network enabled servers and devices. This is may greatly reduce the cost/message for communicating with the cloud server computer(s). These cost savings can be passed on to the merchants/users. Finally, the system provides a secure means of conducting transactions in which the user need not provide his payment details to any merchant, but rather uses only an alias to conduct transactions. The user's payment details are stored safely on the cloud server computer. Thus there is virtually no payment details exchanged between a user and a merchant, which reduces the instances of fraud and identity theft.

Figure 2:
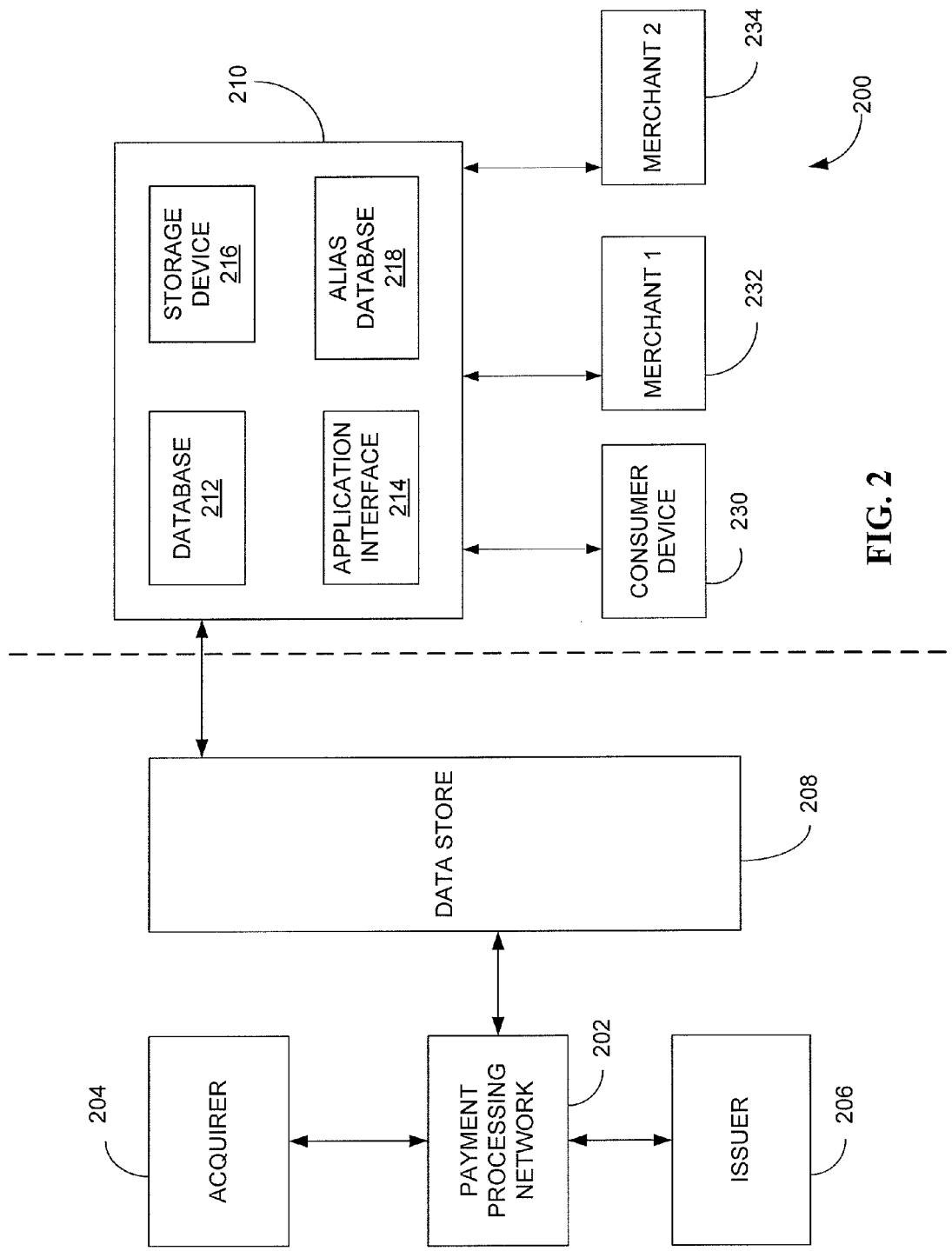
FIG. 2 is a functional block diagram of a system according to an embodiment of the present invention.

FIG. 2 illustrates a functional block diagram of a system 200 according to an embodiment of the present invention. System 200 includes a payment processing network server computer 202 that communicates with an acquirer 204 and an issuer 206. Payment processing network server computer 202 can be implemented, e.g., using the computer system of FIG. 5. Payment processing network server computer 202 receives payment authorization requests and communicates with acquirer 204 and issuer 206 to complete the payment transaction. In some embodiments, payment processing network server computer 202 is similar to the payment processing network server computer 106 of FIG. 1.

Payment processing network server computer 202 also communicates with a data store 208 that stores payment related information. In some embodiments, data store 208 may include, for a particular account, account number, payment device identifier(s) associated with the account, the CVV code associated with the payment device(s), account holder information, etc. In operation, payment processing network server computer 202 consults with data store 208 to retrieve the information needed to process the payment transaction. In some embodiments, data store 208 may be integrated into the payment processing network server computer 202. In other embodiments, data store 208 may be external to payment processing network server computer 202 and may comprise shared data resources. Data store 208 may be implemented using any non-volatile storage medium such as optical disks, HDD, or flash memory. In some embodiments, data store 208 may also include addressing and control circuitry for accessing the data in data store 208.

System 200 may also include a cloud server computer 210 that may be operated by the same entity that operates payment processing network server computer 202. Cloud server computer 210 may be implemented, e.g., by computer system of FIG. 5. Cloud server computer 210 may include a database 212, one or more application interfaces 214, storage device 216, and an alias database 218.

Database 212 may have a subset of information present in data store 208. In some embodiments, database 212 may include all the information from data store 208. Periodically, database 212 is synchronized with data store 208 to ensure that database 212 has the most current information related to user accounts. In some embodiments, for security purposes certain information that is present in data store 208 may not be present in database 212. Database 212 can be implemented using appropriate hardware and software components commonly available. In some embodiments, database 212 can used shared memory architecture. Shared memory is memory that may be simultaneously accessed by multiple programs with intent to provide communication among them or avoid redundant copies. Shared memory is an efficient means of passing data between programs. Depending on context, programs may run on a single processor or on multiple separate processors.

Application interface 214 can include hardware and software for communicating with various external devices. In some embodiments, application interface may include requisite functionality for sending and receiving WSDL messages, JavaScript Object Notation (JSON), and RESTful computing messages. WSDL (Web Services Description Language) is an XML-based language that provides a model for describing Web services. WSDL is often used in combination with SOAP and an XML Schema to provide web services over the Internet. A client program connecting to a web service can read the WSDL file to determine what operations are available on the server. Any special data types used are embedded in the WSDL file in the form of XML Schema. The client can then use SOAP to actually call one of the operations listed in the WSDL file. WSDL is widely used for communications over a network. REST (Representational State Transfer) is a style of software architecture for distributed hypermedia systems such as the World Wide Web. REST-style architectures consist of clients and servers. Clients initiate requests to servers; servers process requests and return appropriate responses. Requests and responses are built around the transfer of representations of resources. A resource can be essentially any coherent and meaningful concept that may be addressed. A representation of a resource is typically a document that captures the current or intended state of a resource.

JSON is a lightweight text-based open standard designed for human-readable data interchange. It is derived from the JavaScript scripting language for representing simple data structures and associative arrays, called objects. Despite its relationship to JavaScript, it is language-independent, with parsers available for most languages. The JSON format is often used for serializing and transmitting structured data over a network connection. It is used primarily to transmit data between a server and web application, serving as an alternative to XML.

Storage device 216 can be implemented using a non-transitory, non-volatile storage media such as hard disks, optical disks, flash memory, etc. In some embodiments, storage device 216 can include several individual storage media. In some embodiments, storage device can have a capacity in excess of 100 terabytes. In some embodiments, storage device 216 may store all the supporting information for a particular transaction.

Figure 2A:
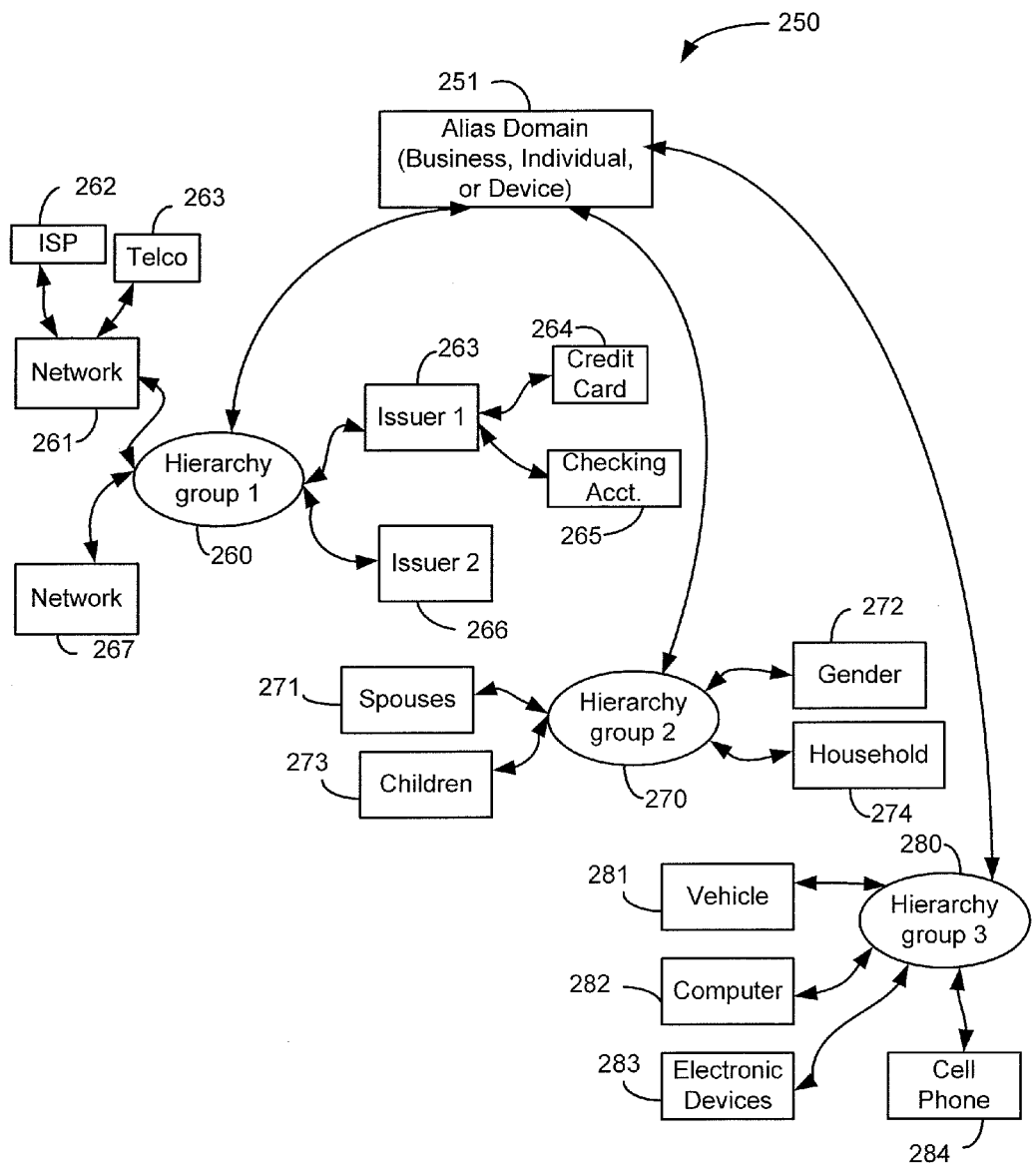
FIG. 2A illustrates an alias data structure according to an embodiment of the present invention.

Alias database 218 may include information about an alias. An alias may be a representation of an individual or a business. In some embodiments, alias database 218 may include biographical information about an alias, information about devices associated with the alias, etc. A detailed description of an alias database is provided in the pending commonly-owned U.S. patent application Ser. No. 12/846,767, filed on Jul. 29, 2010, the contents of which are incorporated by reference herein in its entirety for all purposes. In some embodiments, alias database 218 may be part of database 212. FIG. 2A illustrates an example of data that may be store in alias database 218.

As illustrated in FIG. 2A, alias hierarchy and data structure tree 250 includes a top-level alias 251 to which all other aliases and objects are linked. As described above date illustrated in FIG. 2A may be stored in alias database 218. The alias 251 may be associated with an entity/organization, a person/individual, or a device. In some embodiments, alias 251 may be linked to other aliases within or outside a particular tree. Alias 251 may be linked to various hierarchy groups 260, 270, and 280. The hierarchy groups are used to arrange the data in a manageable form and for ease of search using standard database queries. Each of these hierarchy groups may represent a particular area, e.g., devices, household, individual, entity/business, etc. In FIG. 2A, the hierarchy group 260 is referred to as the business domain. This hierarchy group relates to a business entity that may be owned or operated by owner of the alias 251. The hierarchy group 260 may have several objects linked to it. Each of the objects linked to the hierarchy group 260 in turn may have an alias associated with them. As illustrated, the hierarchy group 260 may have an object 261 associated with it. The object 261 may be a network used by the business entity. The object 261 may further have objects 262 and 263 associated with it. In an embodiment, object 262 may be the internet service provider (ISP) used by the business entity and the object 263 may be the telephone company that provides telephone service to the business entity. In addition, the hierarchy group 260 may have other network type objects linked to it. The object 263 may also have other objects 264 and 265 linked to it. The object 263 may represent a financial institution, e.g., a bank, which issues a credit card 264 and where the business entity has its checking account 265. Each of the objects 264 and 265 may also have an alias associated with them. Similarly, hierarchy group 260 may have another financial institution 266 associated with it that may represent a different bank where the business entity has an account.

Hierarchy group 270 is related to an individual domain. Hierarchy group 270 includes information about an individual and his household. For example, hierarchy group 270 may have an object 271 that represents the spouse of the individual, an object 272 that specifies the gender of the individual, an object 273 that represent the children of the individual, and an object 274 that represents the household of the individual. The object 274 may be further liked to one or more objects that represent, the address of the household, the parcel number of the household, etc. Similarly, object 271 may be further linked to other objects that represent the spouse's age, gender, any other children of the spouse, etc.

Hierarchy group 280 is related to devices that may be used by a business entity or an individual. The hierarchy group 280 may also have various subjects associated with it. In an embodiment, the hierarchy group may have objects 281, 282, 283, and 284 associated with it. The object 281 may represent the vehicle owned by the individual or the business entity. The object 282 may represent the computer owned by the individual or the business entity. The object 283 may represent various other electronic devices owned by the individual or the business entity. The object 284 may represent a cell phone owned by the individual or the business entity. In some embodiments, the object 284 may have additional objects associated with it that may represent various attributes of the object 284. For example, the object 284 may have attributes that represent a phone number, serial number of the cell phone device, a serial number of a SIM card installed in the cell phone, associated with the object 284. In some embodiments, each of the attributes may be an object and have a unique alias associated with the object. As described earlier, each of the objects associated with any of the hierarchy groups may have a unique alias associated with them.

In some embodiments, an object in one hierarchy group may also be associated with another object in a different hierarchy group. For example, object 284 (cell phone) may be associated with object 264 in the instance where the cell phone is also a payment device, e.g., implementing contactless card technology. In some embodiments, one hierarchy group may be linked to another hierarchy group for the same alias or a different alias. For example, if a husband and wife share the same household, the hierarchy group associated with the household may be linked to alias of the husband as well as the alias of the wife, or to any other hierarchy groups that are linked to the alias of the husband or the wife.

Thus it can be seen that each hierarchy group can include multiple levels of objects linked to each other within the same hierarchy group. In addition, objects in one hierarchy group can be linked to objects in different hierarchy groups. It is to be understood that the various objects and aliases illustrated in FIG. 2A are exemplary and the type and amount of objects associated with an alias may depend on whether the alias is an individual or an entity such as a merchant described above.

Referring back to FIG. 2, system 200 may also include one or more user devices 230 and one or more merchant server computers 232, 234. User devices can include mobile communication devices, televisions, PDA's, PC's, and portable computing devices. Each user device 230 may be associated with an alias belonging to the user. In this manner, any transaction originating or terminating at user device 230 can be tracked and properly attributed to the corresponding user. Merchant server computers 232, 234 can be any network enabled server computer that is associated with a merchant. A merchant as used herein can be a corporation (e.g., Google, Facebook, etc.), a service provider (e.g., an insurance company, auto body shop, gas station, etc.), retail outlets (e.g., Sears, Wal-Mart, etc.), a network-based information provider (e.g., search engines, social networks, etc.), or any other entity that provides either a product, a service, or information.

Further, while system 200 is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Now, the operation of system 200 will be described below using an example in which a user needs to get some dental work done, e.g., a root canal, and seeks authorization from his insurance company who may authorize payment for the service. It is to be understood that the scenario described below is given to explain the operation of system 200 and should not be construed to limit the embodiments described herein. Consider that in FIG. 2, user device 230 is a mobile device, merchant 232 is an insurance company, and merchant 234 is a doctor.

After the user associated with user device 230 visits the doctor, the doctor proceeds to get authorization from the insurance company for performance of the service. In order to accomplish this, the doctor (234) may send a service authorization message to cloud server computer 210. Cloud server computer 210 then relays the message to the insurance company (232). The insurance company may need additional information in order to authorize the service, e.g., a dental x-ray of the user. The insurance company may request the additional information from the doctor via cloud server computer 210. The doctor may then upload the x-ray to cloud server computer 210 where it may be stored in storage device 216. The x-ray is then communicated to the insurance company, which may authorize the service. The authorization may be communicated to the doctor along with a transaction ID for that service request. The transaction ID may be used to track the service when a payment request for that service is made.

After the doctor provides the service to the user, the doctor may submit a payment request to cloud server computer 210 for the service along with the transaction ID for that service. Cloud server computer 210 may relay the payment request to the insurance company. Before the insurance company pays the doctor, it may want to verify that the user has indeed received the service. Accordingly, the insurance company may send a validation request to user device 230 via cloud server computer 210. The user can validate that the service was provided by using user device 230. Once the insurance company receives user validation, it can send payment details to cloud server computer 210. In some embodiments, cloud server computer 210 may have payment details for the insurance company stored in database 212. At this point cloud server computer 210 may send the payment details to payment processing network 202 for payment processing. Once the payment is successfully processed, payment processing network 202 may inform cloud server computer 210 of the results, which may be stored by cloud server computer 210. In some embodiments, the results may be communicated to the user and the doctor.

As seen from above, for a single payment transaction for the dental service provided to the user, there are multiple steps that occur. In one embodiment of the present invention, cloud server computer 210 handles all the supporting data and interaction that occurs prior to the payment transaction being processed. In some embodiments, for every 1 payment transaction there may be up to 9 supporting transactions that may occur. Since all the supporting transactions occur directly between end-users (user device 230, merchants 232 and 234) and cloud server computer 210, there is less delay and messages can be handled in an efficient manner. Cloud server computer 210 provides the individual entities with a much faster way of completing a transaction. For example, for the illustrative scenario described above it would have taken weeks for the entire transaction to be completed not counting any scheduling delays between the user and the doctor. However, with system 200, the entire transaction can be completed in matter of minutes and almost real-time. In addition, having a neutral third-party, e.g., VISA, operate the cloud server computer provides all the stake holders with assurance that their information will be properly safeguarded. In addition, it reduces the burden on the merchants and the users of having to track the paperwork and manage multiple channels of communication for every transaction.

Another example where the embodiments of the present invention may be used are in a transactions that involves a user buying gas at a gas station. In this instance merchant 232 may be the gas station where the user intends to buy gas for his car. Even before the user drives to the gas station, the user can communicate with cloud server computer 210 using, e.g., a communication device in his car, to retrieve information associated with the gas station, e.g., gas price, gas availability, etc. The information associated with the gas station may be stored under the alias for the gas station in alias database 218. This information may be updated periodically to reflect the most updated information. In an embodiment, the user device may communicate the alias of the gas station in order to retrieve the information. In addition to the information associated with the gas station, cloud server computer 210 may also gather information about the gas station from one or more information providers, e.g., merchant 234. Such information may include travel time between user's current location to the gas station including traffic conditions, an optimal travel route, reputation of the gas station in terms of average wait time for fill-up, etc. All this information can be sent back to the user device.

The user may then drive to the gas station. The user device may determine that the user is nearing the gas station, e.g., based on location information of the user device, and send an indication to the gas station that the user is about to arrive at the gas station. The indication may include the user's alias information. The gas station server computer may use the user's alias information to request preauthorization from the user's payment card issuer for a potential gas purchase. Since the user's alias information is stored in alias database 218, cloud server computer can determine user's payment device and communicate with the issuer of the payment device to obtain the preauthorization. When the user actually enters the gas station and drives up to a particular pump, the user device may communicate with the gas station server via cloud server computer 210 to indicate user's location. In response to this information, the gas station's server computer can enable that pump for use.

The user may immediately start pumping gas from that pump without having to swipe this card or present any payment device. Once the user has finished dispensing the gas, the gas station server may send the final amount of purchase to cloud server 210 to be communicated to the user's issuer. In some embodiments, the issuer may send a confirmation message to the user's device, via cloud server computer 210, to verify that the user indeed purchased the gas. Once the user confirms the purchase, the payment authorization may proceed according to conventional processes.

Thus, in this exemplary scenario, the user may not have to provide his payment details to the gas station at all. All transactions can be conducted using an alias and the gas station gets paid without ever receiving the user payment details. In addition, providing a secure means for the user to conduct his transactions may result in encouraging user's to use the system.

Figure 3:
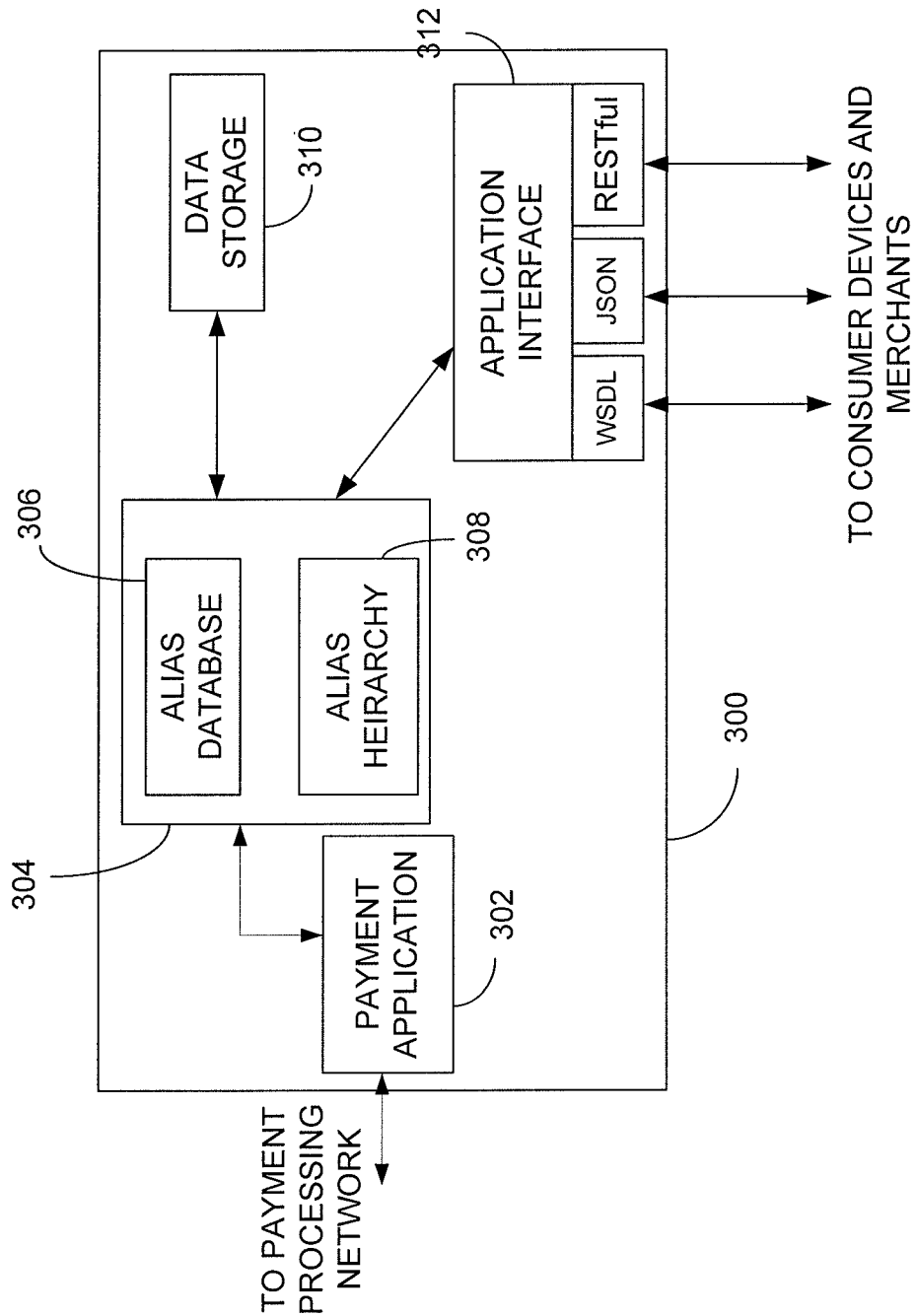
FIG. 3 is a block diagram of a server computer according to an embodiment of the present invention.

FIG. 3 is a functional block diagram of a cloud server computer 300 according to an embodiment of the present invention. Cloud server computer (or cloud server) 300 may include a payment application 302 that may be configured to interact with a payment processing network. The payment application can communicate a payment authorization request to the payment processing network and receive messages associated with payment processing, from the payment processing network.

Cloud server 300 may also include a data store 304 that includes a alias database 306 and alias hierarchy information 308. Alias database 306 may include information about an alias. An alias can be some form of an identifier (e.g., e-mail address) associated with an entity. The entity can either be an individual or a company. In some embodiments, alias database 306 may include biographical information associated with an alias, such as contact information, address, etc. In some embodiments, alias database 306 may also include information about a payment device associated with an alias. As used herein, a payment device can be a credit card, a debit card, a smart card, an account number, etc. In some embodiments, alias database 306 may be synchronized with the database associated with the payment processing network (e.g., data store 208 of FIG. 2).

Data store 304 may also include alias hierarchy information 308. In an embodiment, alias hierarchy information may include associations between and alias and one or more objects (e.g., devices, real property, etc.) and between two or more aliases. For example, one of the objects may be the cell phone associated with the alias. So, in the example above, when the insurance company communicates with the user to validate that the service was provided by the doctor, it may send a message to the cloud server computer with the alias information for the user. The cloud server may look up the cell phone number of the user and send the message to the cell phone. When a reply is received from the user, the cloud server computer may verify that the cell phone from where the reply originated is associated with the user. Thus, this may provide an additional level of security and verification.

Cloud server 300 may also include data storage 310. Data storage may include multiple storage devices working in synchronization to provide data storage capability. In some embodiments, data storage may have a storage capacity in excess of 100 terabytes. In some embodiments, most of the supporting documentation associated with a particular transaction may be stored in data storage 310. For example, in the example discussed above, the dental x-ray and any other documentation related to the service provided by the doctor may be stored in data storage 310. For this reason, it is desirable to have the storage capacity of data storage 310 as high as possible.

Cloud server 300 may also include an application interface 312. Application interface 312 may communicate with external systems such as other network-enabled user devices and other network-enabled server computers that may reside at merchant locations. It is estimated that are approximately 1 billion network-enabled user devices are in operation currently and are projected to grow at an annual rate of 1 billion/year. In order to interact with all these external systems, application interface 312 may use WSDL messaging, JSON, and/or RESTful computing architecture. Use of these techniques ensures that the cost of processing the large amount of transactions with the external systems is kept at a minimum. Application interface 312 can be implemented using any suitable hardware and/or software components that are designed to utilize WSDL, JSON, and/or RESTful messaging.

Further, while cloud server computer 300 is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Figure 4:
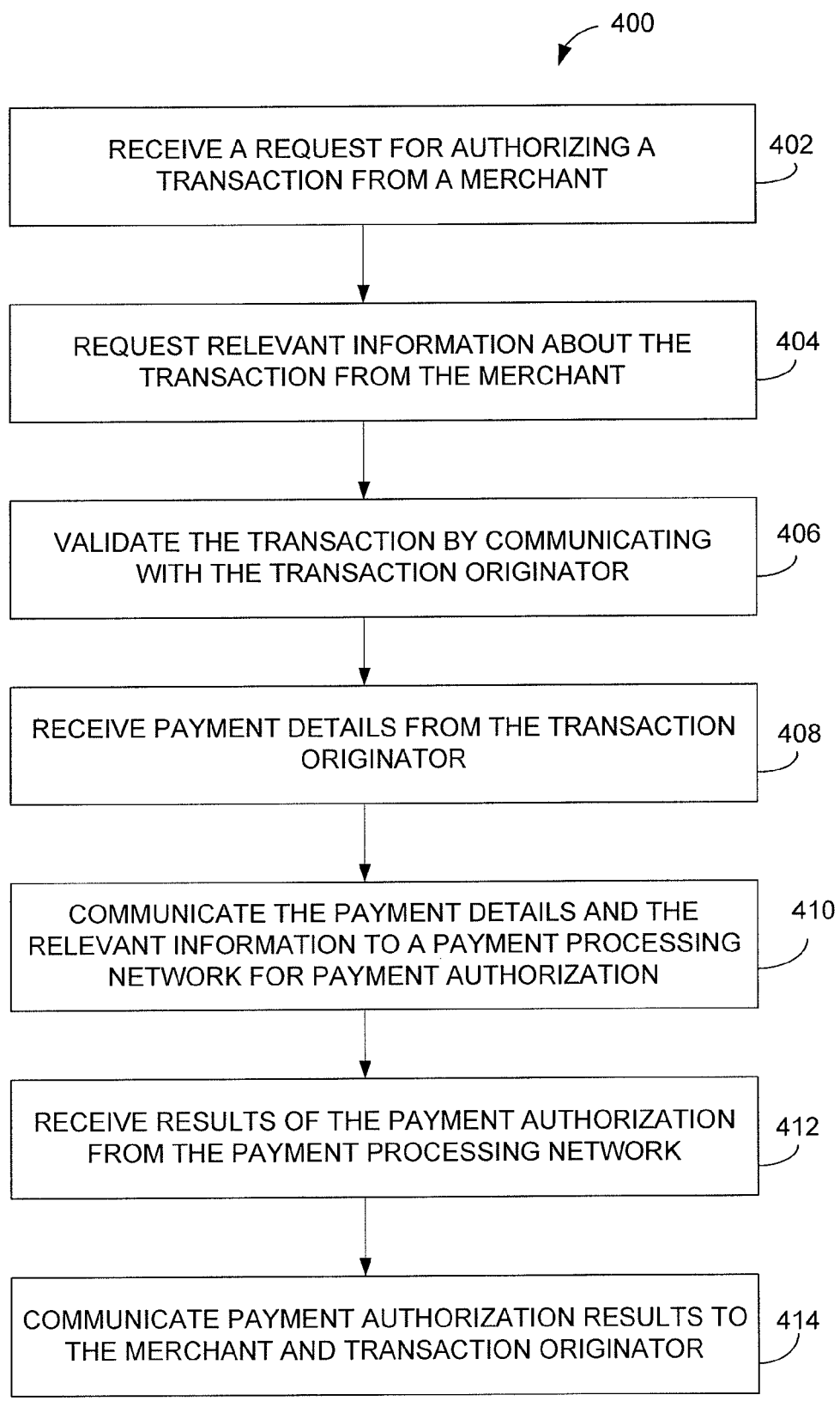
FIG. 4 is a flow diagram of a process for a method for processing payment transaction according to an embodiment of the present invention.

FIG. 4 is a flow diagram of a process 400 for processing a transaction according to an embodiment of the present invention. Process 400 may be performed, e.g., by cloud server computer 300 of FIG. 3.

Initially, the cloud server may receive a request for authorizing a transaction from a merchant (402). The cloud server may request additional information about the transaction from the merchant (404). In some embodiments, the additional information may include documentation, images, audio, etc. The cloud server may communicate with the other entity or entities involved in the transaction for validating the transaction (406). For example, if the transaction is a request from a merchant for getting paid for an item purchased by a user, the user may be asked to validate that he/she indeed purchased the item for which payment is being requested. Once the other entity validates the transaction, the cloud server may receive payment details from the other entity (408). In some embodiments, payment details may include information about a payment device to be used for paying for the item purchased. Once the payment details are received, the cloud server may send the payment details to a payment processing network (410) for further processing. In some embodiments, prior to sending the payment details, the cloud server may verify that the payment details are associated with the other entity, e.g., by consulting the alias database 306 of FIG. 3. Thereafter, the cloud server may receive results from the payment processing operation from the payment processing network (412). The cloud server may then communicate the results to the merchant and the user (414). In some embodiments, after completion of the transaction, the cloud server may archive all the data related to that transaction and associate an identifier to it for ease of retrieval later.

It should be appreciated that the specific steps illustrated in FIG. 4 provide a particular method of processing a transaction according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
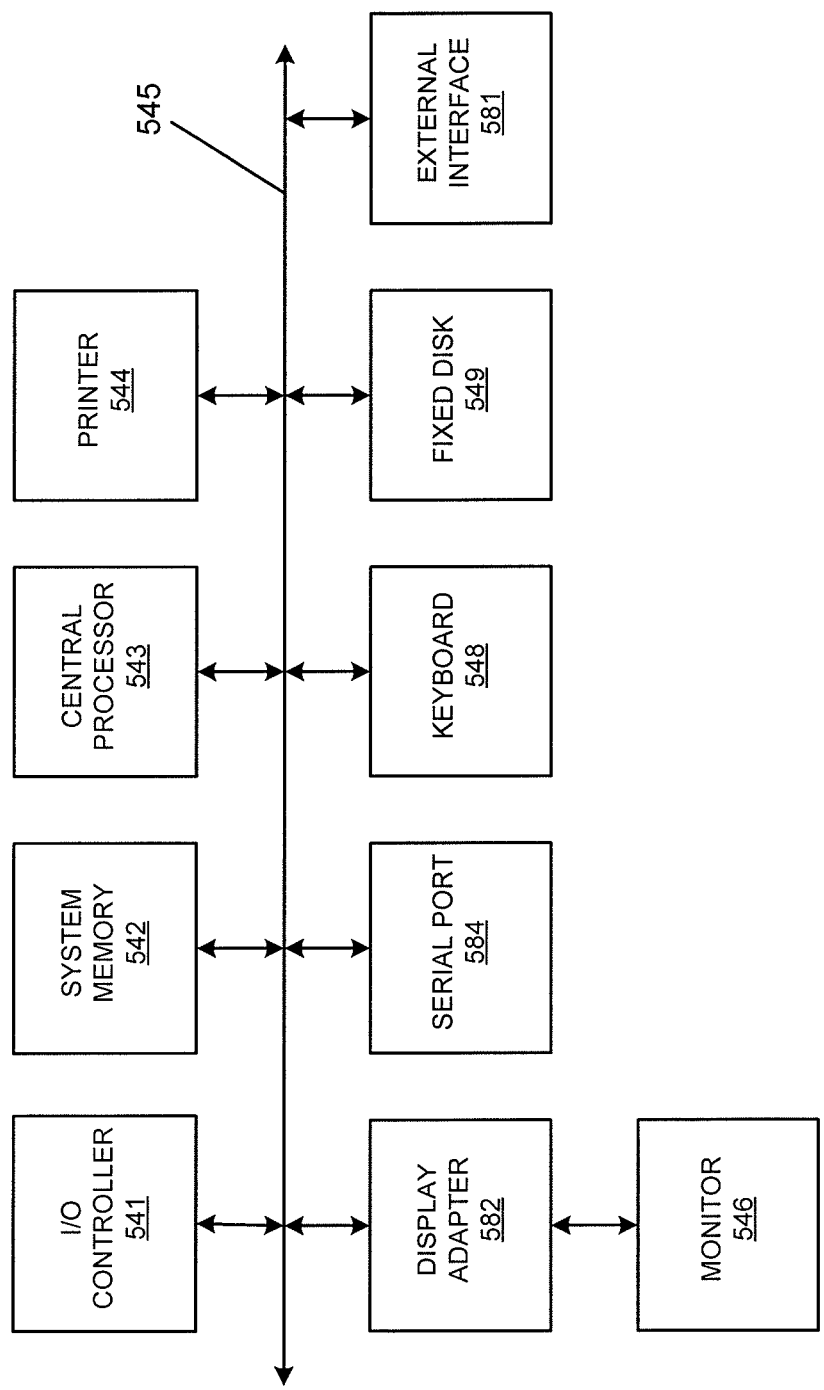
FIG. 5 is a block diagram of a computer system.

FIG. 5 is a high level block diagram of a computer system that may be used to implement any of the individual components described above and may include one or more of the subsystems or components shown in FIG. 5, which is a block diagram of a computer apparatus. The subsystems shown in FIG. 5 are interconnected via a system bus 545. Additional subsystems such as printer 544, keyboard 548, fixed disk 549, monitor 546, which is coupled to display adapter 582, and others are shown. Peripherals and input/output (I/O) devices, which couple to I/O controller 541, can be connected to the computer system by any number of means known in the art, such as serial port 584. For example, serial port 584 or external interface 581 can be used to connect the computer apparatus to a wide area network such as the Internet, a mouse input device, or a scanner. The interconnection via system bus 545 allows central processor 543 to communicate with each subsystem and to control the execution of instructions from system memory 542 or fixed disk 549, as well as the exchange of information between subsystems. The system memory 542 and/or fixed disk 549 may embody a computer readable medium.

Figure 6:
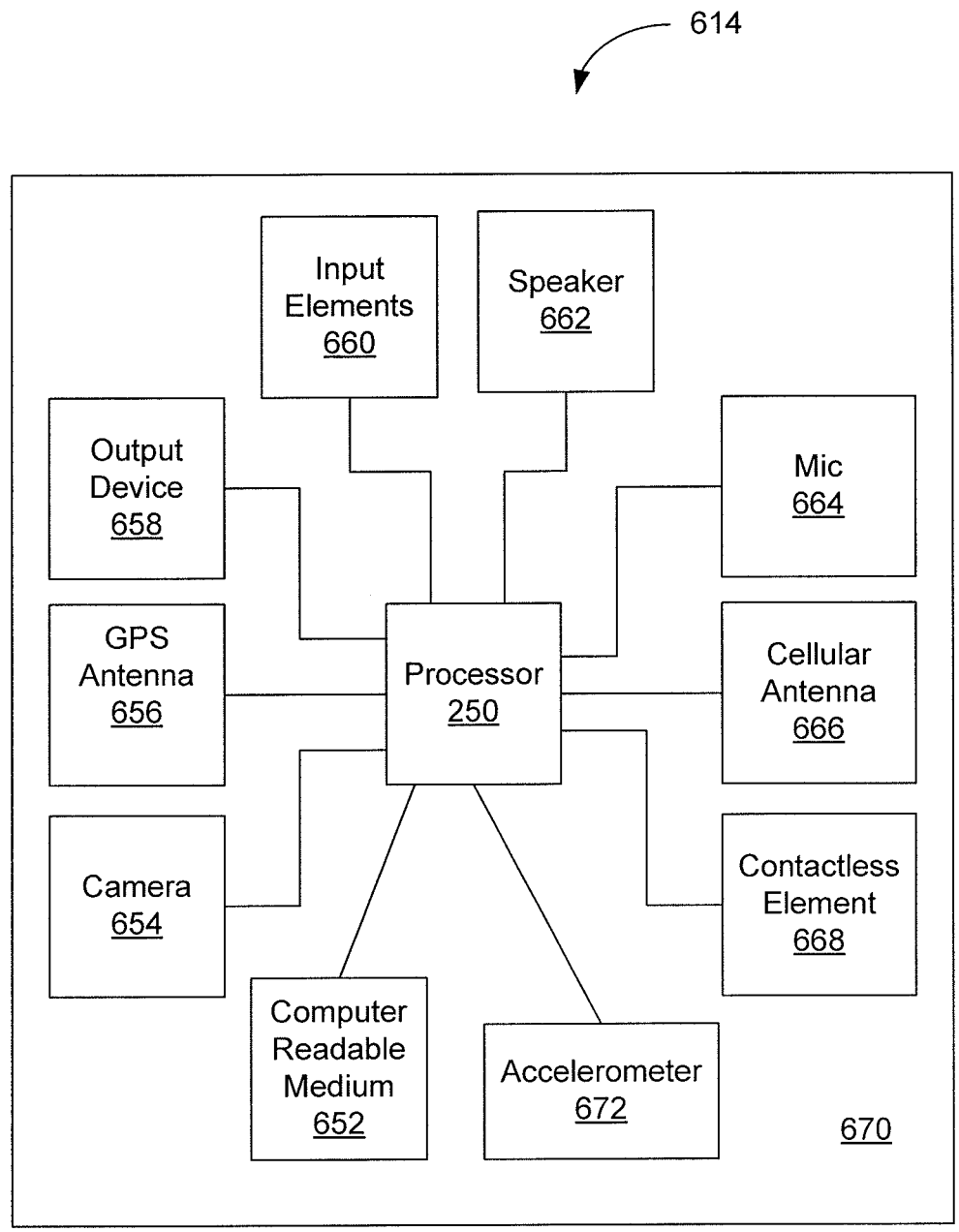
FIG. 6 is a block diagram of an exemplary user device.

FIG. 6 is a block diagram of the basic components that may reside in an exemplary user device 614, e.g., a mobile phone, a car stereo unit, etc. according to an embodiment of the present invention. User device 614 comprises a computer readable medium (CRM) 652. CRM 652 may be present within a body 670, or may be detachable from it. Body 670 may be in the form a plastic substrate, housing, or other structure. CRM 652 may be a memory that stores data and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, bank identification number (BIN), credit or debit card number information, account balance information, expiration date, user information such as name, date of birth, etc. Any of this information may be transmitted by user device 614.

CRM 652, or memory, may further comprise any suitable code. The code may be suitable to perform any or all of the functionality of user mobile device 614 as described herein. In some embodiments, CRM 614, or memory, comprises: (a) code for receiving information from the cloud server computer; (b) code for sending information to the cloud server computer; (c) code for sending information to the issuer computer; (d) code for sending information to the payment processing network computer; (e) code for receiving information from the payment processing network computer; and/or (f) code for receiving information from the issuer computer.

User device 614 also comprises a camera 654. Camera 654 is operable to take pictures (i.e., acquire images), video, etc. and may include any type of image-acquiring device known in the art. User device 614 may also comprise a GPS antenna 656. GPS antenna 656 is operable to receive transmissions from GPS satellites for identifying a location of user device 614. GPS antenna 656 may include any type of antenna operable to receive transmissions from GPS satellites as is known in the art.

User device 614 may also comprise other elements typically included in a user mobile communication device. For example, user device 614 may also include a processor 650 (e.g., a microprocessor) for processing the functions of the user device 614 and an output device 658 (e.g., a display) to allow a user to see phone numbers and other information and messages, e.g., an authentication request message or a verification message. User device 614 may further include input elements 660 to allow a user to input information into the device, a speaker 662 to allow the user to hear voice communication, music, etc., and a microphone 664 to allow the user to transmit his/her voice through user device 614. User device 614 may also include a cellular antenna 666 for wireless voice and data transfer (e.g., voice and data transmission). User device 614 may also include a contactless element 668, which is typically implemented in the form of a semiconductor chip (or other data storage element) with an associated wireless transfer (e.g., data transmission) element, such as an antenna. Contactless element 668 functions to permit the exchange of data and/or control instructions between user mobile device 614 and an optional contactless element included in a merchant access device.

User device 614 may also include an accelerometer 672. Accelerometer 672 is typically implemented in the form of an integrated circuit chip. Accelerometer 672 can measure the proper acceleration of user mobile device 614. In some embodiments, accelerometer 672 can be a multi-axis accelerometer. The accelerometer readings can be communicated to other external systems for further processing.

Although FIG. 6 shows a number of components, user device 614 according to embodiments of the present invention may comprise any suitable combination or subset of such components.

Any of the software components or functions described in this application, may be implemented as software code to be executed by a processor using any suitable computer language such as, for example, Java, C++, JSON, or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:

1. A system for processing transactions, the system comprising:
   a payment processing network server computer to communicate with an issuer to process payment requests; and
   a network-enabled server computer comprising a processor and a memory device coupled to the processor, the memory device comprising instructions executable by the processor to communicate with one or more external systems, wherein the instructions are further executable by the processor to:
   receive a payment request, from a first merchant computer associated with a first entity, for authorizing payment for a transaction corresponding to a service provided by the first entity to a user;
   send, to the first merchant computer, a request for additional information to validate the transaction, wherein the additional information includes audio, video, documentation, or a combination thereof, and wherein the additional information is produced for providing the service to the user;
   in response to receiving the additional information, send, to a second merchant computer associated with a second entity, the additional information to validate the transaction based on the additional information;
   receive, from the second merchant computer, a response indicating validation of the transaction, wherein validation of the transaction is determined using the additional information;
   send a validation request to a user device to validate the payment request;
   receive, from the user device, a response to the validation request;
   receive, from the user device, an alias identifier for a user associated with the transaction;
   determine payment account information for the user based at least in part on the alias identifier; and
   communicate the payment account information to the payment processing network server computer, wherein the payment processing network server computer processes the payment for the transaction using the payment account information.

2. The system of claim 1 wherein the instructions are further executable by the processor to:
   receive information from the payment processing network server computer indicating successful processing of the payment for the transaction; and communicate the information to one or both of the first merchant computer or the user device.

3. The system of claim 1 wherein the payment processing network server computer is configured to:
communicate with the issuer associated to authorize the payment using the payment account information; and
communicate with an acquirer associated with the first merchant to complete payment for the transaction.

4. The system of claim 1 wherein the network-enabled server computer communicates with the user device and the first merchant computer using WSDL or JSON messaging techniques.

5. The system of claim 1 wherein the network-enabled server computer communicates with the user device and the first merchant computer using RESTful computing techniques.

6. A method for processing a payment transaction, the method comprising, by a server computer:
receiving, from a first merchant server computer associated with a first entity, a transaction authorization request for payment related to a transaction corresponding to a service provided by the first entity to a user;
sending, to the first merchant server computer, an information request for additional information to validate the transaction, wherein the additional information includes audio, video, documentation, or a combination thereof, and wherein the additional information is produced for providing the service to the user;
receiving, from the first merchant server computer, the additional information responsive to the information request;
sending, to a second merchant server computer associated with a second entity, the additional information to validate the transaction based on the additional information;
receiving, from the second merchant server computer, a response indicating validation of the transaction, wherein the validation is determined using the additional information;
sending, to a user device associated with the user, a validation request to validate the transaction;
receiving, from the user device, validation information to validate the transaction;
receiving, from the user device, alias information associated with the user of the user device;
sending, to a payment processing network server computer, payment account information associated with the alias information and transaction information;
receiving, from the payment processing network server computer, results of payment transaction processing for the transaction; and
sending, to the first merchant server computer, the results of the payment transaction processing.

7. The method of claim 6 wherein the transaction authorization request, the additional information, the validation request, the validation information, the alias information, and the results of the payment transaction processing are sent using one or both of WSDL or JSON techniques.

8. The method of claim 6 wherein the transaction authorization request, the information request, the validation request, the validation information, the alias information, and the results of the payment transaction processing are sent using RESTful computing techniques.

9. The method of claim 6 wherein the transaction authorization request includes alias information of the user.

10. The method of claim 9 further comprising:
prior to sending the validation request, consulting an alias database to determine the user device associated with the alias.

11. The method of claim 6 wherein the payment account information is stored in the server computer.

12. A server computer comprising:
a processor; and
a memory device coupled to the processor, the memory device comprising instructions executable by the processor to communicate with one or more external systems, wherein the instructions are further executable by the processor to:
receive a payment request, from a first merchant computer associated with a first entity, for authorizing payment for a transaction corresponding to a service provided by the first entity to a user;
send, to the first merchant computer, a request for additional information to validate the transaction, wherein the additional information includes audio, video, documentation, or a combination thereof, and wherein the additional information is produced for providing the service to the user;
in response to receiving the additional information, send, to a second merchant computer associated with a second entity, the additional information to validate the transaction based on the additional information;
receive, from the second merchant computer, a response indicating validation of the transaction, wherein the validation is determined using the additional information;
send a validation request to a user device to validate the payment request;
receive, from the user device, a response to the validation request;
receive, from the user device, an alias identifier for a user associated with the transaction;
determine payment account information for the user based at least in part on the alias identifier; and
communicate the payment account information to a payment processing network server computer, wherein the payment processing network server computer processes the payment for the transaction using the payment account information.

13. The server computer of claim 12 further comprising:
an alias database comprising information about one or more aliases; and
an alias hierarchy database comprising association information between an alias and one or more objects associated with the alias.

14. The server computer of claim 13 wherein the one or more aliases comprise identifiers associated with a plurality of entities, wherein an entity includes an individual or a company.

15. The server computer of claim 13 wherein the alias database includes payment account information associated with an alias.

16. The server computer of claim 13 wherein the one or more objects include mobile communication devices, televisions, and gaming consoles.

17. The server computer of claim 12 wherein the instructions are further executable by the processor to:
receive, from the second merchant computer, a user validation request to determine whether the user received the service provided by the first entity for the transaction, wherein the validation request is sent to the user device in response to receiving the user validation request.

18. The system of claim 1 wherein the instructions are further executable by the processor to:
receive, from the second merchant computer, a user validation request to determine whether the user received the service provided by the first entity for the transaction, wherein the validation request is sent to the user device in response to receiving the user validation request.

19. The system of claim 1 wherein the instructions are further executable by the processor to:
determine that the response to the validation request indicates that the user received the service provided by the first entity for the transaction; and
upon determining, based on the response to the validation request, that the user received the service provided by the first entity, send, to the second merchant computer, a notification that the user received the service provided by the first entity.

20. The system of claim 19 wherein the instructions are further executable by the processor to:
in response to the notification, receive, from the second merchant computer, payment account information for the second entity; and
communicate the payment account information for the second entity to the payment processing network server computer.

* * * * *